United States Patent [19]

Dobler et al.

[11] Patent Number: 4,508,069
[45] Date of Patent: Apr. 2, 1985

[54] INTERNAL COMBUSTION ENGINE BALANCE SHAFT BEARING ARRANGEMENT AT THE CRANKCASE

[75] Inventors: Helmut Dobler, Esslingen; Rolf Zeller, Burgstetten; Helmut Seitz, Stuttgart, all of Fed. Rep. of Germany

[73] Assignee: Daimler-Benz Aktiengesellschaft, Stuttgart, Fed. Rep. of Germany

[21] Appl. No.: 598,008

[22] Filed: Apr. 9, 1984

[30] Foreign Application Priority Data

Apr. 23, 1983 [DE] Fed. Rep. of Germany ....... 3314801

[51] Int. Cl.³ .............................................. F16F 15/26
[52] U.S. Cl. .................................. 123/192 B; 74/604
[58] Field of Search ...................... 123/192 B, 192 R; 74/603, 604; 464/180

[56] References Cited

U.S. PATENT DOCUMENTS 2,214,921  9/1940  Criswell ................................. 74/604
4,000,666  1/1977  Ito et al. ........................... 123/192 B

FOREIGN PATENT DOCUMENTS 975104   7/1961   Fed. Rep. of Germany .
2531239  2/1976   Fed. Rep. of Germany .
674225   9/1949   United Kingdom .
2100800  12/1982  United Kingdom ............ 123/192 B

OTHER PUBLICATIONS

"ATZ Automobiltechnishe Zeitschrift 83 (1981) 11", pp. 583–590.

Primary Examiner—Ira S. Lazarus
Assistant Examiner—R. S. Bailey
Attorney, Agent, or Firm—Walter W. Burns, Jr.

[57] ABSTRACT

A bearing arrangement for the balance shafts for balancing second order inertia forces on an internal combustion engine, in which the balance shafts run parallel to the crankshaft on both longitudinal walls of the crankcase, and have the ends carrying the balance weights supported by means of journal bearings within the crankcase and having driven ends supported by means of roller bearings outside the crankcase in the region of a crankcase end wall.

19 Claims, 1 Drawing Figure

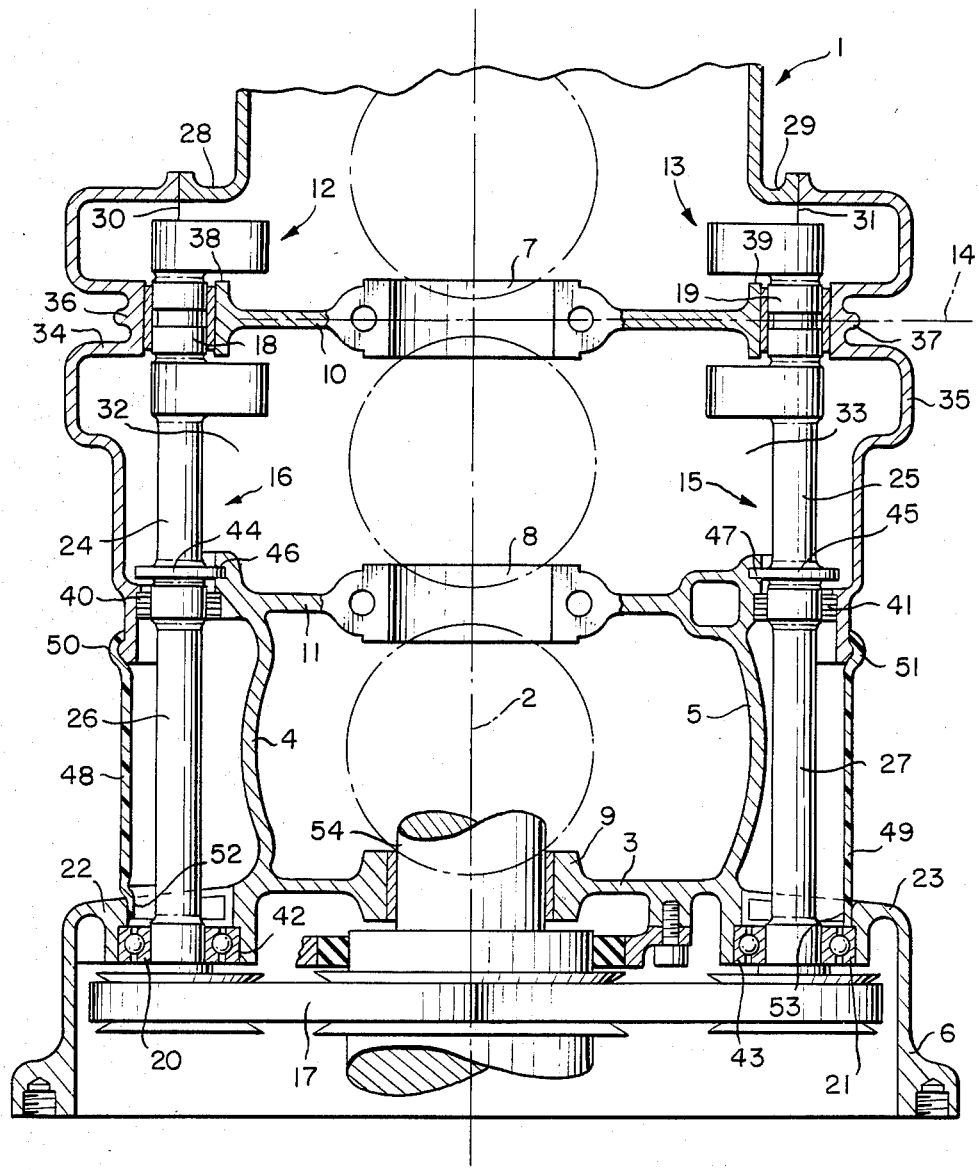

INTERNAL COMBUSTION ENGINE BALANCE SHAFT BEARING ARRANGEMENT AT THE CRANKCASE

The invention concerns a bearing arrangement for balance shafts running parallel to a crankshaft on both side walls of a crankcase of an internal combustion engine for the balancing of second order inertia forces, the driven ends of the balance shafts being held approximately in the plane of a crankcase end face and the ends of the balance shafts lying in the region of the transverse central plane of the crankshaft and carrying the balance weights being held by bearings on the crankcase, the bearings supporting the balance weights consisting of sliding bearings connected to the lubricant circuits of the internal combustion engine.

In a known bearing arrangement of this type (ATZ, Automobiltechnische Zeitschrift, 1981, page 586), each of the balance shafts are supported, in particular, on bearing housings cast on the outside of both longitudinal sides of the crankcase, by means of sliding bearings at each end, which sliding bearings are connected to the lubricating oil circuit of the internal combustion engine. The axial positioning of the balance shafts takes place by means of the sliding bearings present at the drive end, which sliding bearings are held in flanged bushes separate from the bearing housing by means of thrust discs solid with the shaft and, in the installed condition of the shafts, are fastened to the bearing housing.

The known arrangement has the disadvantage that the bearings on the crankcase can only be located in regions where a connection to the lubricating oil circuit of the machine can take place. Particularly in the case of the bearing provided at the drive end, such an arrangement is not always possible because, taking account of the position of the shaft drive, the driving wheels of the balance shafts and hence the bearing positions must be located offset in the longitudinal direction relative to the crankcase end wall, whereby the connection to the lubricating oil supply becomes completely impossible or is only possible with substantial structural alternations to the crankcase.

Because of the bearing housings being closed off from the crankcase, it is necessary to displace the bearings of the balance shafts outwards from the side walls at least by the dimension of the radial protrusion of the balance weights, whereby the bearing housings protrude far outwards from both side walls and the crankcase becomes wider overall. The bearing housings protruding outwards from the side walls are associated with the further disadvantage that it is impossible to arrange the engine components (such as the exhaust and induction pipes) as close as possible to the wall and the internal combustion engine therefore requires a larger installation space.

An object of the invention is to improve the known bearing arrangement that, at least for the bearings at the driven end, location on the crankcase independent of the lubricating oil supply from the engine lubricating oil circuit is possible and that the balance shafts can be placed as close as possible to the two side walls.

It is another object for the invention to provide bearings present at the driven end of balance shafts which are independent of the lubricating oil circuit and can, therefore, be placed at unfavorable positions on the crankcase.

It is another object of the invention to provide journal bearings for balance shafts placed within the crankcase, the connection to the lubricating oil circuit being readily made.

It is another object of the invention to provide balance shafts wherein the bearings at the driven end are independent of lubricating oil from the crankshaft.

It is another object of the invention to provide bearings for balance shafts at the driven end which can be located at advantageous locations on the side walls of the crankcase.

It is another object of the invention to provide a crankcase with narrow installation requirements.

It is another object of the invention to provide casings for balance shafts having reduced installation dimensions.

It is another object of the invention to provide a casing for balance shafts wherein sealing surfaces lying at an angle to one another can be avoided.

It is another object of the invention to provide bearings for balance shafts of an internal combustion engine supporting one end of the balance shafts located within and lubricated by the crankcase together with bearings at the driven end of the balance shafts whose lubrication is independent of the crankcase.

It is another object of the invention to provide balance shafts for an internal combustion engine, each shaft consisting of a shaft section lying within the crankcase which shaft section includes journal bearings and balance weights and a shaft section extending outside the crankcase near the adjacent side wall and including a rolling bearing, the length of which shaft section corresponds approximately to the distance between two crankshaft main bearings.

It is another object of the invention to provide balance shafts for an internal combustion engine having good accessibility to the internally positioned shaft sections wherein both side walls of the crank case have open box-shaped crankcase extensions protruding outwards at the sides to accept shaft sections lined within a crankcase, the crankcase extension being parallel to flange surfaces lying in the longitudinal central axis of the balance shafts in contact with which flange surfaces there are bearing covers which are screwed to the side walls.

It is another object of the invention to provide seating and sealing surfaces for a crankshaft within attendant balance shafts wherein machining of all seating and sealing surfaces can take place from outside the crankcase with journal bearing housings being rigidly held in the crankcase, such that the bearing housings of the journal bearings are formed, half each, by the bearing cover and the crankcase, their joints lying the planes of flange surfaces and the crankcase halves being cast at the side onto the central crankshaft main bearing transfer stiffening rib.

It is another object of the invention to provide balance shafts for an internal combustion engine with appropriate positions of the openings for leading the balance shafts out of the crankcase making possible simple and lasting sealing for the openings wherein passages of the balance shafts out of the crankcase lie in a side extension of the strengthening rib of the crankshaft main bearing located between adjacent cylinders, openings of which crankcase, executed as fitting holes and having one-half in an end wall of the crank case extension and the other half in the bearing cover, are sealed towards the outside by shaft sealing rings.

It is a further object of the invention to provide balance shafts for an internal combustion engine having advantageous axial positioning features by the rolling bearing being designed as location bearings for the axial positioning of the balance shafts and the balance shafts are provided with a shaft collar at approximately half the length of the shaft which shaft collar is held in a groove segment on the inner side of each of the openings.

It is yet another object of the invention to provide balance shafts for an internal combustion engine wherein a simple and appropriate covering of the externally located shaft section of the balance shaft is obtained by means of plastic shells covering the external shaft sections of the balance shaft, which shells are held in clip fashion with their edges on longitudinally running ribs of side walls one end of a shell being on a bearing cover and another end in a crankcase opening of the rolling bearings.

These and other objects, features, and advantages of the present invention will become more apparent from the following description when taken in connection with the accompanying drawing which shows, for the purposes of illustration only, one embodiment in accordance with the present invention.

The FIGURE, wherein like reference numerals represent the structural elements, shows a longitudinal section of the crankcase 1 of an internal combustion engine with four cylinders arranged in line and shows the region including the bearings of the balance shafts. By 2 is indicated the crankcase longitudinal central axis, in whose vertical longitudinal plane, the crankshaft 54, only partially shown, and the cylinders, shown chain-dotted, are located in the crankcase 1. The crankcase 1 is bounded on the output drive side by an end wall 3 and transversely by side walls 4 and 5. The clutch casing 6, within which the flywheel and the vehicle clutch are located, is connected to the end wall 3 and protrudes beyond the side walls 4 and 5. Bearing seats are cast within the crankcase 1 to support the crankshaft, of which bearing seats, only the bearing seat 7 extending within the casing transverse central plane between the second and third cylinder and the bearing seat 8 lying between the third and fourth cylinder are shown. There is a crankshaft end bearing 9 in the end wall 3. The bearing seats 7 and 8 are strengthened by transverse ribs 10 and 11, which form a composite structure with the side walls 4 and 5.

The balance weights 12 and 13, which rotate in opposite directions, lie approximately in the transverse central plane 14 of the crankcase 1 and near the two side walls 4 and 5, provide the second order inertia balancing. The balance weights 12 and 13 are each located at the ends of balance shafts 15 and 16, which are led along parallel to the crankshaft in the region of the side walls 4 and 5 from the central transverse plane 14 to the end wall 3.

The masses 12 and 13 are driven, via the balance shafts 15 and 16, by the crankshaft at twice the crankshaft rotational speed, by means of a belt drive 17 provided at the flywheel end.

The balance shafts 15 and 16 are supported in the crankcase 1 with the ends which carry the weights 12 and 13 in journal bearings 18 and 19 and with the driven ends in ball or rolling bearings 20, 21, the journal bearings 18, 19 being located within the crankcase in transverse extension of the transverse rib 10, which extends within the transverse central plane 14, and the ball or rolling bearings 20, 21, being located outside the crankcase 1 in the wall parts 22, 23 of the clutch casing 6, which wall parts 22, 23 continue as a transverse extension of the end wall 3. By means of the combination of a journal bearing and a ball or rolling bearing for the balance shafts 15, 16, it is possible, on the one hand, to connect the journal bearings 18 and 19 to the lubricating oil circuit of the internal combustion engine without particular difficulty by means of holes provided in the transverse rib 10 and, on the other hand, to locate the ball or rolling bearings provided with permanent lubrication means at suitable bearing positions on the crankcase 1 independent of the lubricating oil circuit. Furthermore, this removes the necessity for holes to the lubricating oil circuit and the special sealing of the bearing positions relative to the clutch housing 6.

As may be seen from the drawing, the arrangement of the balance shafts 15, 16 on the side walls 4 and 5 occurs in such a manner that, in each case, one shaft section 24 or 25 including the masses 12, 13 and the journal bearings 18, 19 lies within the crankcase and one shaft section 26 or 27 including the ball or rolling bearings 20, 21 lies outside the crankcase. The lengths of the individual shaft sections 24, 26 and 25, 27 are then matched to the distances between the crankcase main bearings, so that the shaft sections 24 and 25 extend between the bearing seats 7 and 8 of the main bearings and the shaft sections 26 and 27 extend from the bearing seat 8 to the end bearing 9 in the end wall 3.

So that the balance shafts 15 and 16 can be assembled from outside, crankcase extensions 28 and 29 protruding slightly outwards are provided on both side walls 4 and 5 to accept the shaft sections 24 and 25 lying within the crankcase 1. The crankcase extensions 28 and 29 end in flange surfaces 30 and 31, which enclose openings 32 and 33 for inserting the shaft sections 24 and 25 and which lie within the longitudinal central axis of the balance shafts 15 and 16. The openings 32 and 33 are each closed by a bearing cover 34 and 35, respectively, screwed onto the side walls 4 and 5.

Because of the arrangement of the balance weights 12 and 13, together with journal bearings 18 and 19, in a bearing housing (crankcase extensions 28, 29) open toward the internal space of the crankcase 1, the distance between the crankshaft and the balance shafts can be kept small, a position of the balance shafts 15 and 16 on the longitudinal walls 4 and 5 as possible. By means of the bearing arrangement, in accordance with the invention, of the balance shafts, the previous narrow construction of known crankcases can, therefore, be substantially maintained.

The journal bearings 18 and 19 are located in the bearing housings, which consist of half-housings 36 and 37, respectively, formed by the bearing covers 34 and 35 and the half-housings 38 and 39, each cast to one side of the transverse rib 10, their joints lying in the planes of the flange surfaces 30 and 31.

In a side extension of the transverse rib 11 lying between the third and fourth cylinder, the crankcase extensions 28 and 29 together with the bearing covers 34 and 35 form end walls, in which openings 40 and 41 are provided, from which the shaft sections 24 and 25 are led out of the crankcase to the outside. The openings 40 and 41 are designed as fitting holes, into which shaft sealing rings are inserted.

The ball or rolling bearings 20 and 21 are inserted in bearing holes 42 and 43 which are located in the wall parts 22 and 23 at a distance from the end wall 3. In order to secure the balance shafts 15 and 16 in the longitudinal direction, these are each provided with a shaft collar 44, 45, which is held in a grooved segment 46, 47, respectively, cast onto the side of the transverse rib 11.

Independent of this, it is conceivable that the axial positioning of the balance shafts 15 and 16 can occur by means of the ball or rolling bearings 20 and 21.

The shaft sections (26, 27), led externally along the side walls 4 and 5, are covered by plastic shells 48 and 49, which are held by their edges on longitudinally running ribs of the side walls 4 and 5 and with their ends 50 and 51 on the bearing covers 34 and 35 and the ends 52 and 53 in the housing openings of the rolling bearings 20 and 21.

While we have shown and described only one embodiment in accordance with the present invention, it is understood that the same is not limited thereto but is susceptible to numerous changes and modifications as known to one having ordinary skill in the art, and we, therefore, do not wish to be limited to the details shown and described herein, but intend to cover all such modifications as are encompassed by the scope of the appended claims.

We claim:

1. A bearing arrangement for balance shafts running parallel to a crankshaft on both side walls of a crankcase of an internal combustion engine for balancing of second order inertia forces, driven ends of the balance shafts being held approximately in a plane of a crankcase end face and ends of the balance shafts lying in the region of the transverse central plane of the crankshaft, the balance shaft carrying balance weights held by bearings on the crankcase, the bearings supporting the balance weights consisting of journal bearings connected to a lubricant circuit of the internal combustion engine, wherein the journal bearings are located within the crankcase and the bearings present at the driven ends of the balance shafts comprise rolling bearings with permanent lubrication located outside the crankcase.

2. A bearing arrangement according to claim 1, wherein bearing housings of the journal bearings are formed, half each, by a bearing cover and the crankcase, joints therebetween lying in planes of flange surfaces and the crankcase halves being cast at the side onto a central crankshaft main bearing transverse stiffening rib.

3. A bearing arrangement according to claim 2, wherein the internal combustion engine has four cylinders and passages for the balance shafts out of the crankcase lie in a side extension of a strengthening rib of a crankshaft main bearing located between third and fourth cylinders, openings of which crankcase, executed as fitting holes and having one half in an end wall of the crankcase extension and the other half in the bearing cover are sealed towards the outside by shaft sealing rings.

4. A bearing arrangement according to claim 3, wherein the rolling bearings are designed as location bearings for the axial positioning of the balance shafts.

5. Bearing arrangement according to claim 2, wherein the internal combustion engine has four cylinders and the passages for the balance shafts out of the crankcase lie in a side extension of the strengthening rib of a crankshaft main bearing located between third and fourth cylinders, openings of which crankcase, executed as fitting holes and having one half in an end wall of the crankcase extension and the other half in the bearing cover, are sealed towards the outside by shaft sealing rings.

6. A bearing arrangement according to claim 2, wherein the rolling bearings are designed as location bearings for the axial positioning of the balance shafts.

7. Bearing arrangement according to claim 1, wherein both side walls have open box-shaped crankcase extensions protruding outwards at the sides to accept the shaft sections lying within the crankcase, the crankcase extensions being parallel to flange surfaces lying in a longitudinal central axis of the balance shafts in contact with which flange surfaces there are bearing covers which are screwed to side walls of the crankcase.

8. A bearing arrangement according to claim 7, wherein the bearing housings of the journal bearing are formed, half each, by a bearing cover and the crankcase, their joints therebetween lying in planes of flange surfaces and the crankcase halves being cast at the side onto a central crankshaft main bearing transverse stiffening rib.

9. A bearing arrangement according to claim 7, wherein the internal combustion engine has four cylinders and the passages for the balance shafts out of the crankcase lie in a side extension of the strengthening rib of a crankshaft main bearing located between third and fourth cylinders, openings of which crankcase, executed as fitting holes and having one half in an end wall of the crankcase extension and the other half in the bearing cover are sealed towards the outside by shaft sealing rings.

10. A bearing arrangement according to claim 7, wherein the rolling bearings are designed as location bearings for the axial positioning of the balance shafts.

11. Bearing arrangement according to claim 1, wherein the rolling bearings are designed as location bearings for the axial positioning of the balance shafts.

12. Bearing arrangement according to claim 1, wherein for axial positioning, the balance shafts are each provided with a shaft collar at approximately half the length of the shaft, which shaft collar is held in a groove segment on the inner side of each of openings between the crankcase and a bearing cover.

13. Bearing arrangement according to claim 1, wherein the external shaft sections are covered by plastic shells which are held in clip fashion with their edges on longitudinally running ribs of crankcase side walls, one of their ends being on the bearing covers and with other ends in crankcase openings of the rolling bearings.

14. A bearing arrangement for balance shafts running parallel to a crankshaft on both side walls of a crankcase of an internal combustion engine for balancing of second order inertia forces, driven ends of the balance shafts being held approximately in a plane of a crankcase end face and ends of the balance shafts lying in the region of the transverse central plane of the crankshaft, the balance shafts carrying balance weights held by bearings on the crankcase, the bearings supporting the balance weights consiting of journal bearings connected to a lubricant circuit of the internal combustion engine, wherein the journal bearings are located within the crankcase and the bearings present at driven ends of the balance shafts comprise rolling bearings with permanent lubrication, located outside the crankcase, and wherein the balance shafts each comprise:

a shaft section lying within the crankcase, which shaft section includes the journal bearing and the balance weights, and a shaft section extending outside the crankcase near the adjacent side wall of the crank case and including the rolling bearing, the length of each shaft section corresponding approximately to the distance between two crankshaft main bearings.

15. A bearing arrangement according to claim 14, wherein both side walls of the crankcase have open box-shaped crankcase extensions protruding outwards at the sides to accept the shaft sections lying within the crankcase, the crankcase extensions being parallel to flange surfaces lying in a longitudinal central axis of the balance shafts, in contact with which flange surfaces there are bearing covers, which are screwed to side walls of the crankcase.

16. A bearing arrangement according to claim 14, wherein the bearing housings of the journal bearing are formed, half each, by a bearing cover and the crankcase, their joints therebetween lying in planes of flange surfaces and the crankcase halves being cast at the side onto a central crankshaft main bearing transverse stiffening rib.

17. A bearing arrangement according to claim 14, wherein the internal combustion engine has four cylinders and the passages for the balance shafts out of the crankcase lie in a side extension of the strengthening rib of a crankshaft main bearing located between third and fourth cylinders, openings of which crankcase, executed as fitting holes and having one half in an end wall of the crankcase extension and the other half in the bearing cover are sealed towards the outside by shaft sealing rings.

18. A bearing arrangement according to claim 14, wherein the rolling bearings are designed as location bearings for the axial positioning of the balance shafts.

19. A bearing arrangement according to claim 14, wherein for axial positioning, the balance shafts are each provided with a shaft collar at approximately half the length of the shaft, which shaft collar is held in a groove segment on the inner side of each of openings between the crankcase and a bearing cover.

* * * * *